(12) United States Patent
Yamaguchi et al.

(10) Patent No.: US 9,214,848 B2
(45) Date of Patent: Dec. 15, 2015

(54) DRIVING APPARATUS

(71) Applicant: HONDA MOTOR CO., LTD., Tokyo (JP)

(72) Inventors: Tadashi Yamaguchi, Wako (JP); Masashi Inoue, Wako (JP); Yoshihisa Matsuoka, Wako (JP); Keisuke Azusawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/311,353

(22) Filed: Jun. 23, 2014

(65) Prior Publication Data
US 2015/0022064 A1    Jan. 22, 2015

(30) Foreign Application Priority Data
Jul. 16, 2013    (JP) ................................. 2013-147440

(51) Int. Cl.
*H02K 16/00* (2006.01)
*H02K 11/00* (2006.01)
*H02K 7/00* (2006.01)

(52) U.S. Cl.
CPC ............... *H02K 16/00* (2013.01); *H02K 7/006* (2013.01); *H02K 11/0015* (2013.01); *H02K 11/0031* (2013.01)

(58) Field of Classification Search
CPC ........................................................ H02K 16/00
USPC .................................................. 310/112–114
See application file for complete search history.

(56) References Cited

U.S. PATENT DOCUMENTS

| | | | | |
|---|---|---|---|---|
| 5,998,901 | A | * | 12/1999 | Kawabata et al. ............. 310/114 |
| 7,402,923 | B2 | * | 7/2008 | Klemen et al. ................... 310/54 |
| 2005/0028613 | A1 | * | 2/2005 | Onoda et al. ............. 73/862.331 |
| 2008/0169712 | A1 | * | 7/2008 | Koyama et al. ................... 310/71 |
| 2010/0254642 | A1 | * | 10/2010 | Watanabe et al. ............. 384/448 |

FOREIGN PATENT DOCUMENTS

| | | |
|---|---|---|
| JP | 2009-286367 | 12/2009 |
| WO | WO 2009/128288 | 10/2009 |

* cited by examiner

*Primary Examiner* — Dang Le
(74) *Attorney, Agent, or Firm* — Mori & Ward, LLP (57) ABSTRACT

A driving apparatus includes a first electrical rotating machine, a second electrical rotating machine, a first resolver, and a second resolver. The first resolver is configured to detect a rotation angle of the first electrical rotating machine. The second resolver is configured to detect a rotation angle of the second electrical rotating machine. The first and second electrical rotating machines and the first and second resolvers are coaxially disposed inside a casing. The first resolver and the second resolver are provided between the first electrical rotating machine and the second electrical rotating machine.

16 Claims, 4 Drawing Sheets

DRIVING APPARATUS

CROSS-REFERENCE TO RELATED APPLICATIONS

The present application claims priority under 35 U.S.C. §119 to Japanese Patent Application No. 2013-147440, filed Jul. 16, 2013, entitled "Driving Apparatus." The contents of this application are incorporated herein by reference in their entirety.

BACKGROUND

1. Field

The present disclosure relates to a driving apparatus.

2. Description of the Related Art

Driving units for vehicles having an engine, a motor, and a generator can be found, for example, in International Publication No. 2009-128288 and Japanese Unexamined Patent Application Publication No. 2009-286367. In the driving unit for hybrid vehicle according to International Publication No. 2009-128288, the motor and the generator are coaxially disposed, and two resolvers that respectively detect the rotation angle of the motor and the generator are coaxially disposed on an outer side in the axial direction of the motor and the generator.

In the hybrid driving unit according to Japanese Unexamined Patent Application Publication No. 2009-286367 also, two electrical rotating machines are coaxially disposed. The resolvers that detect the rotation angle of the respective electrical rotating machines are formed in larger diameters and located on an outer side in the axial direction of the two electrical rotating machines so as to axially overlap the bearing, so that the axial length of the driving unit can be reduced.

SUMMARY

According to one aspect of the present invention, a driving apparatus includes a first electrical rotating machine, a second electrical rotating machine, a first resolver, and a second resolver. The first resolver detects a rotation angle of the first electrical rotating machine. The second resolver detects a rotation angle of the second electrical rotating machine. The first and second electrical rotating machines and the first and second resolvers are coaxially disposed and accommodated inside a casing. The first resolver and the second resolver are located between the first electrical rotating machine and the second electrical rotating machine.

According to another aspect of the present invention, a driving apparatus includes a first electrical rotating machine, a second electrical rotating machine, a first resolver, and a second resolver. The first resolver is configured to detect a rotation angle of the first electrical rotating machine. The second resolver is configured to detect a rotation angle of the second electrical rotating machine. The first and second electrical rotating machines and the first and second resolvers are coaxially disposed inside a casing. The first resolver and the second resolver are provided between the first electrical rotating machine and the second electrical rotating machine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
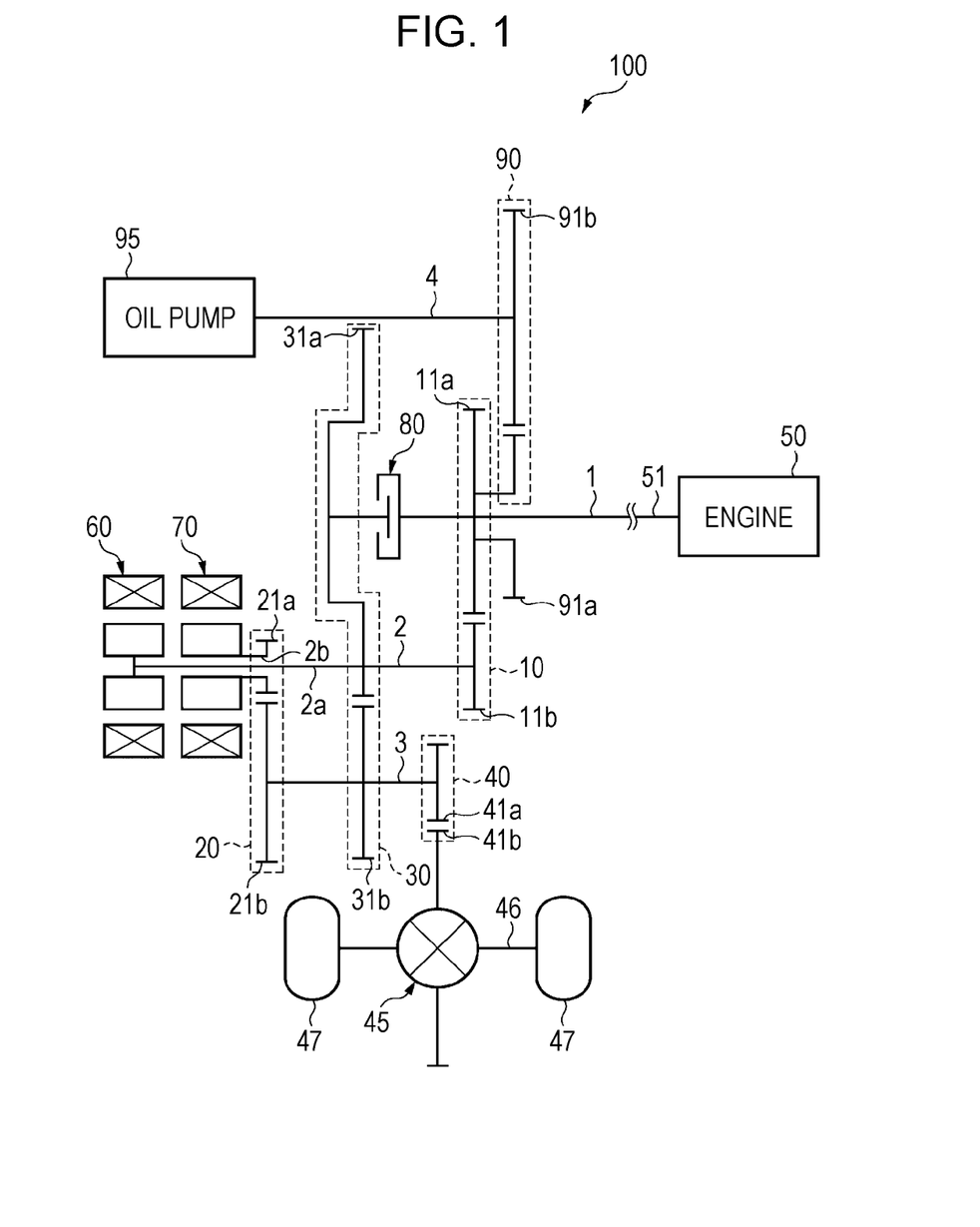
FIG. 1 is a schematic diagram of a driving unit for hybrid vehicle according to an embodiment of the present disclosure.

Hereafter, an embodiment of a driving unit for hybrid vehicle according to the present disclosure will be described in details with reference to the drawings. FIG. 1 is a schematic diagram of the driving unit for hybrid vehicle according to the embodiment of the present disclosure, FIG. 2 is a cross-sectional view of the driving unit for hybrid vehicle according to the present disclosure, FIG. 3 is an enlarged cross-sectional view of a portion marked as III in FIG. 2, and FIG. 4 is a schematic drawing for explaining the positional relationship in the transmission mechanism of the driving unit for hybrid vehicle shown in FIG. 2.

The driving unit for hybrid vehicle 100 according to this embodiment includes, as shown in FIG. 1, an engine shaft 1, a generator shaft 2, and an idler shaft 3 all of which are disposed parallel to each other, and the generator shaft 2 at least includes an inner circumferential shaft 2a and a hollow outer circumferential shaft 2b disposed so as to relatively rotate with respect to the inner circumferential shaft 2a. The engine shaft 1 connected to a crank shaft 51 of an engine 50 is connected to the inner circumferential shaft 2a of the generator shaft 2 via a generator driving gear 10, and a generator 60 (first electrical rotating machine) is provided on the axial line of the generator shaft 2. A motor 70 (second electrical rotating machine) is provided on the axial line of the outer circumferential shaft 2b of the generator shaft 2, the outer circumferential shaft 2b is connected to the idler shaft 3 via a motor driving force transmission gear 20, and the engine shaft 1 and the idler shaft 3 are connected to each other via an engine driving force transmission gear 30. The idler shaft 3 and a differential unit 45 are connected via a final gear 40, and the differential unit 45 is connected to driving wheels 47, 47 via a differential shaft 46. In addition, the engine shaft 1 includes a clutch 80 that connects and disconnects the transmission of the driving force between the engine shaft 1 and the idler shaft 3 via the engine driving force transmission gear 30.

The driving unit for hybrid vehicle 100 generally configured as above according to this embodiment includes a transmission route through which the driving force of the motor 70 is transmitted to the driving wheels 47, 47 to allow the vehicle to run, and another transmission route through which the driving force of the engine 50 is transmitted to the driving wheels 47, 47 to allow the vehicle to run, and a selected one or both of the transmission routes are employed for driving the vehicle.

Figure 2:
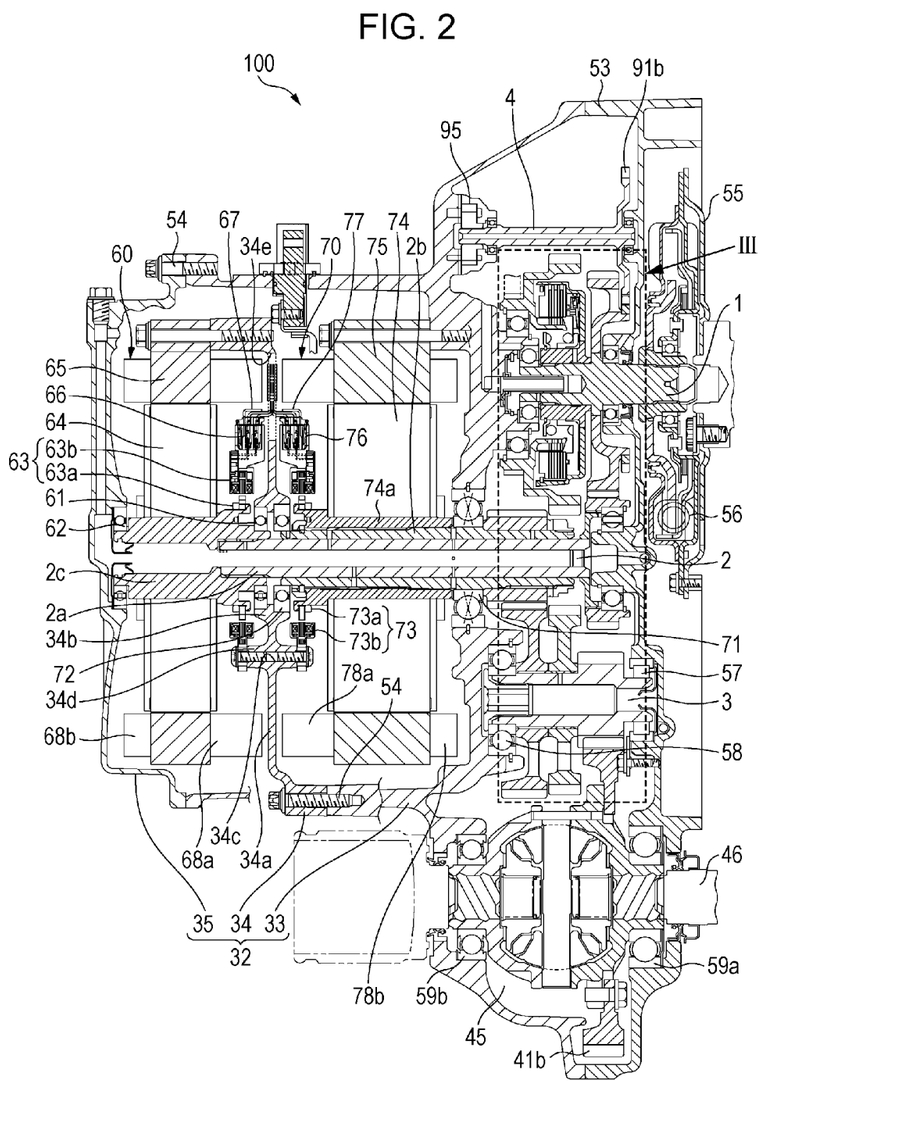
FIG. 2 is a cross-sectional view of the driving unit for hybrid vehicle according to the present disclosure, taken along a line II-II in FIG. 4.
Figure 3:
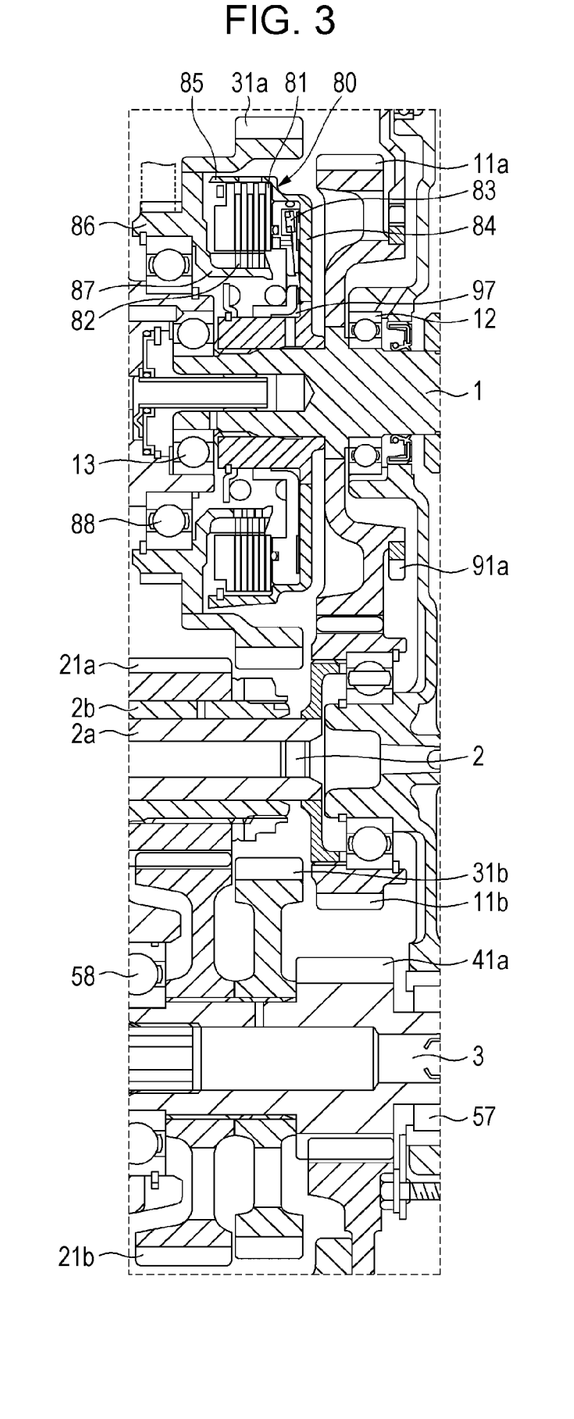
FIG. 3 is an enlarged cross-sectional view of a portion marked as III in FIG. 2.
Figure 4:
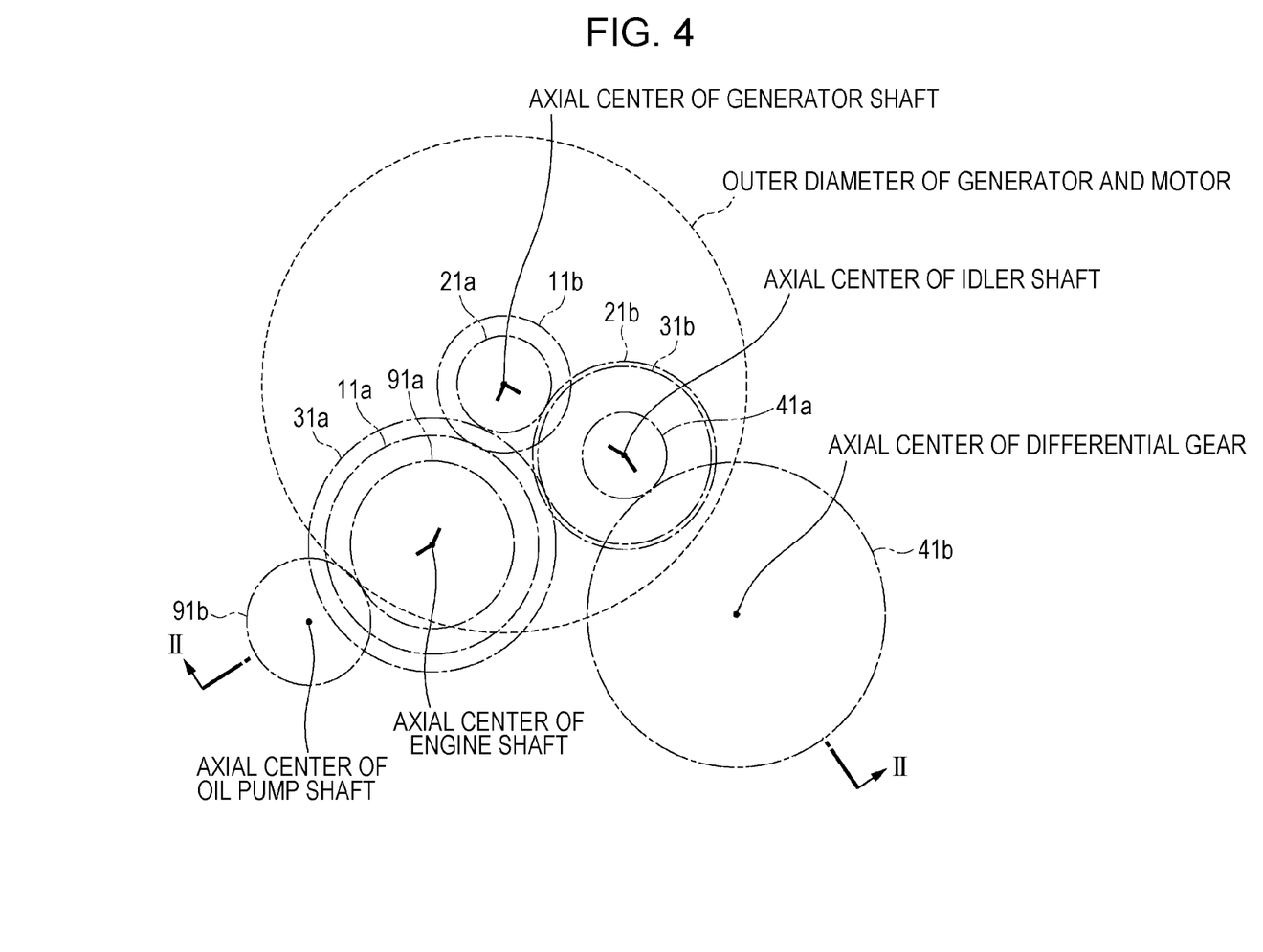
FIG. 4 is a schematic drawing for explaining the positional relationship in the transmission mechanism of the driving unit for hybrid vehicle shown in FIG. 2.

Referring to FIGS. 2 to 4, the configuration of the driving unit for hybrid vehicle 100 according to this embodiment will be specifically described.

The driving unit for hybrid vehicle 100 according to this embodiment is accommodated in a driving unit casing 32 composed of a first, a second, and a third casing 33, 34, 35, from the side of the engine 50. The first casing 33 is fixed to a damper housing 53 that accommodates therein a damper 56, and the second and third casings 34, 35 are each fixed to the first casing 33 with a plurality of bolts 54.

The engine shaft 1 is disposed coaxially with the crank shaft 51 of the engine 50, and supported by the damper housing 53 via a bearing 12 on the side of the engine 50, and supported by the first casing 33 via a bearing 13 on the opposite side of the engine 50. The driving force of the crank shaft 51 is transmitted to the engine shaft 1 through a drive plate 55 and the damper 56. An output gear 11*a* constituting the generator driving gear 10 is provided at a central portion of the engine shaft 1 in the axial direction, and the clutch 80 is provided on the opposite side of the engine 50 with respect to the output gear 11*a*. Further, an output gear 91*a* constituting an oil pump driving gear 90 is provided adjacent to the output gear 11*a* on the side of the engine 50, the output gear 91*a* being interlocked with the output gear 11*a*.

The clutch 80 is what is known as a multi-plate clutch, including a plurality of disk-shaped clutch disks 81 and clutch plates 82, and a clutch piston 83 that biases the clutch disks 81 and the clutch plates 82. The clutch disks 81 have the outer periphery supported by a cylindrical outer hub 85 provided on a first clutch retainer 84, and are movable in the axial direction. The clutch plates 82 have the inner periphery supported by a cylindrical inner hub 87 fixed to a second clutch retainer 86, and are movable in the axial direction. The clutch disks 81 and the clutch plates 82 are alternately stacked, parallel to each other and spaced from each other in the axial direction.

An output gear 31*a* constituting the engine driving force transmission gear 30 is attached to the outer peripheral edge of the second clutch retainer 86 so as to rotate interlocked therewith, and the second clutch retainer 86 has its inner circumferential surface of the base portion supported by the first casing 33 via a bearing 88.

The clutch 80 configured as above causes the clutch disks 81 and the clutch plates 82 to contact each other and move away from each other, upon controlling the hydraulic pressure in an operation chamber 97. When the pressure inside the operation chamber 97 is increased beyond a predetermined threshold, the clutch disks 81 and the adjacent clutch plates 82 are frictionally engaged with each other so that the clutch 80 is connected, and the second clutch retainer 86 is directly connected to the engine shaft 1 thus to be locked up. At this point, since the output gear 31*a* constituting the generator driving gear 10 is attached to the second clutch retainer 86, the driving force of the engine shaft 1 is transmitted to the idler shaft 3 through the clutch 80 and the engine driving force transmission gear 30. At the same time, the driving force of the engine shaft 1 is transmitted to the generator shaft 2 through the generator driving gear 10.

The generator shaft 2 is disposed parallel to the engine shaft 1, and includes the inner circumferential shaft 2*a*, the outer circumferential shaft 2*b* for motor located around the inner circumferential shaft 2*a*, and an outer circumferential shaft 2*c* for generator. More specifically, an input gear 1*ib*, meshed with the output gear 11*a* of the generator driving gear 10 of the engine shaft 1, is attached to an end portion of the inner circumferential shaft 2*a* on the side of the engine 50, and the outer circumferential shaft 2*b* for motor is attached to a generally central position to the inner circumferential shaft 2*a* so as to relatively rotate with respect thereto. Further, outer circumferential shaft 2*c* for generator, spline-coupled with the inner circumferential shaft 2*a* so as to rotate interlocked therewith, is attached to the end portion of the inner circumferential shaft 2*a* opposite to the engine 50, at a position adjacent to the outer circumferential shaft 2*b* for motor.

The outer circumferential shaft 2*c* for generator, to which the generator 60 is attached so as to rotate interlocked therewith, has the end portion on the side of the engine 50 supported by the second casing 34, more accurately by the flange portion 34*a* of the second casing 34 extending radially inward between the generator 60 and the motor 70, via a bearing 61, and has the end portion opposite to the engine 50 supported by the third casing 35 via a bearing 62.

The outer circumferential shaft 2*b* for motor, to which the motor 70 is attached so as to rotate interlocked therewith, includes an output gear 21*a* constituting the motor driving force transmission gear 20 located at the end portion on the side of the engine 50. In addition, the outer circumferential shaft 2*b* for motor is located between the motor 70 and the output gear 21*a* and supported by the first casing 33 via a bearing 71, and has the end portion opposite to the engine 50 supported by the flange portion 34*a* of the second casing 34 via a bearing 72.

Here, the flange portion 34*a* includes a widened portion 34*b* extending in the axial direction from the end portion on the side of the rotating shaft (generator shaft), so as to support the two bearings 62, 71 from the radially outer side.

The generator 60 includes a rotor 64 having the inner circumferential end portion fixed to the outer circumferential shaft 2*c* for generator and a stator 65 fixed to the second casing 34 and opposed to the rotor 64.

The motor 70 includes a rotor 74 having the inner circumferential end portion fixed to the outer circumferential shaft 2*b* for motor via a rotor holder 74*a* and a stator 75 fixed to the first casing 33 and opposed to the rotor 74.

The stators 65, 75 of the generator 60 and the motor 70 each have a segmented winding structure. The winding of the stator 65 of the generator 60 includes a pair of crossover sections 68*a*, 68*b*, each of which has a different axial height, formed on the respective axial end portions because, for example, the connection of the segment coils is made on one of the end portions in the axial direction. Likewise, the winding of the stator 75 of the motor 70 includes a pair of crossover sections 78*a*, 78*b* each of which has a different axial height, formed on the respective axial end portions for the same reason. The stators 65, 75 of the generator 60 and the motor 70 are disposed such that the end face of the generator 60 where the crossover section 68*a* having the higher axial height is located and the end face of the motor 70 where the crossover section 78*a* having the higher axial height is located are opposed to each other, so as to define a space in which a first and a second resolver 63, 73 to be subsequently described can be accommodated. Further, the crossover sections 68*b*, 78*b* formed on the respective axially outer end faces of the generator 60 and the motor 70 are lower in axial height, and therefore allow the first casing 33 and the third casing 35 to be located closer to each other, thus contributing to reducing the axial length of the driving unit 100.

The idler shaft 3 is disposed parallel to the generator shaft 2, and includes, sequentially from the side of the engine 50, an output gear 41*a* constituting the final gear 40, an input gear 31*b* meshed with the output gear 31*a* of the engine shaft 1 and constituting the engine driving force transmission gear 30, and an input gear 21*b* meshed with the output gear 21*a* of the outer circumferential shaft 2*b* for motor attached to the generator shaft 2 so as to relatively rotate and constituting the motor driving force transmission gear 20. The end portion of the idler shaft 3 on the side of the engine 50 is supported by the damper housing 53 via a bearing 57, and the end portion opposite to the engine 50 is supported by the first casing 33 via a bearing 58.

Accordingly, the driving force of the engine shaft 1 can be converted into electric power upon being transmitted to the inner circumferential shaft 2a of the generator shaft 2 through the generator driving gear 10 to thereby rotate the rotor 64 of the generator 60 through the inner circumferential shaft 2a and the outer circumferential shaft 2c for generator. Further, when the motor 70 is made to rotate by the power supplied from the generator 60, the outer circumferential shaft 2b for motor is caused to rotate, so that the driving force of the motor 70 is transmitted to the idler shaft 3 because of the meshing between the output gear 21a of the outer circumferential shaft 2b for motor constituting the motor driving force transmission gear 20 and the input gear 21b of the idler shaft 3.

In addition, when the clutch 80 is connected, the driving force of the engine 50 is transmitted to the idler shaft 3 because of the meshing between the output gear 31a of the engine shaft 1 constituting the engine driving force transmission gear 30 and the input gear 31b of the idler shaft 3.

In the differential unit 45, the differential shaft 46 disposed parallel to the idler shaft 3 has the end portion on the side of the engine 50 supported by the damper housing 53 via a bearing 59a, and has the end portion opposite to the engine 50 supported by the first casing 33 via a bearing 59b. The differential unit 45 includes an input gear 41b constituting the final gear 40, meshed with the output gear 41a of the idler shaft 3 so as to transmit the driving force of the motor 70 and/or the engine 50 inputted to the idler shaft 3 to the differential shaft 46, and then to the driving wheels 47, 47 via the differential shaft 46.

The output gear 91a constituting the oil pump driving gear 90 fixed to the engine shaft 1 is meshed with an input gear 91b of the oil pump shaft 4 disposed parallel to the engine shaft 1, so as to transmit the driving force of the engine shaft 1 to the oil pump 95. The oil pump 95 serves to generate the hydraulic pressure for operating the clutch 80, and to force-feed the oil for lubricating and cooling the operative components.

Now, the driving unit 100 according to this embodiment includes, inside the driving unit casing 32, a first resolver 63 that detects a rotation angle of the generator 60, i.e., the outer circumferential shaft 2c for generator and a second resolver 73 that detects a rotation angle of the motor 70, i.e., the outer circumferential shaft 2b for motor, the first resolver 63 and the second resolver 73 being coaxially disposed between the generator 60 and the motor 70 and around the generator shaft 2.

More specifically, the first resolver 63 includes a first resolver rotor 63a located between the bearing 61 and the generator 60 and attached to the outer circumferential shaft 2c for generator, and a first resolver stator 63b located so as to oppose the first resolver rotor 63a. The second resolver 73 includes a second resolver rotor 73a located between the bearing 72 and the motor 70 and attached to a rotor holder 74a disposed so as to rotate interlocked with the outer circumferential shaft 2b for motor, and a second resolver stator 73b located so as to oppose the second resolver rotor 73a.

The flange portion 34a of the second casing 34 includes a boss 34d formed on the radially outer face of the widened portion 34b, and the first resolver stator 63b and the second resolver stator 73b are fixed with a bolt screwed in a hole 34c formed in the boss 34d for common use. Such a configuration allows the first resolver stator 63b and the second resolver stator 73b to be located on the radially outer side with respect to the widened portion 34b of the second casing 34, and the bearings 61, 72 and the first and second resolvers 63, 73 to be located closer to each other, without incurring interference between the flange portion 34a and the first and second resolver stators 63b, 73b.

The first resolver stator 63b and the second resolver stator 73b are oriented opposite to each other in the axial direction such that the respective signal line draw-out portions 66, 76 are located close to the center therebetween. In other words, the signal line draw-out portions 66, 76 are located closer to the flange portion 34a than are the resolver stators 63b, 73b. Further, the signal line draw-out portions 66, 76 are located on the radially outer side with respect to the boss 34d including the common hole 34c, at a position where the boss 34d is not located.

The axial width of the first resolver 63 and the second resolver 73 including the signal line draw-out portions 66, 76 of the resolver stators 63b, 73b is generally the same as the axial height of the crossover sections 68a, 78a of the stator 65, 75 having the higher axial height.

Further, a first signal line 67 connected to the signal line draw-out portion 66 of the first resolver stator 63b and a second signal line 77 connected to the signal line draw-out portion 76 of the second resolver stator 73b are bundled together and drawn out from the driving unit casing 52 through a routing hole 34e provided in the flange portion 34a of the second casing 34, to be connected to a non-illustrated control unit.

As described thus far, the driving unit for hybrid vehicle 100 according to the present disclosure includes the generator 60, the motor 70, the first resolver 63 that detects the rotation angle of the generator 60, and the second resolver 73 that detects the rotation angle of the motor 70, all of which are coaxially disposed inside the driving unit casing 32, and the first resolver 63 and the second resolver 73 are located between the generator 60 and the motor 70. Such a configuration allows the first and second resolvers 63, 73 to be accommodated in the dead space defined between the generator 60 and the motor 70, thereby suppressing an increase in overall axial length of the driving unit.

Further, the first resolver 63 includes the first resolver stator 63b and the first resolver rotor 63a, and the second resolver 73 includes the second resolver stator 73b and the second resolver rotor 73a. The first resolver stator 63b and the second resolver stator 73b are oriented opposite to each other in the axial direction such that the respective signal line draw-out portions 66, 76 are located close to the center therebetween, and the first signal line 67 from the first resolver stator 63b and the second signal line 77 from the second resolver stator 73b are bundled together and connected to the control unit. Such a configuration simplifies the routing work of the first signal line 67 and the second signal line 77.

Further, second casing 34 includes the flange portion 34a formed between the first resolver 63 and the second resolver 73 to support the generator shaft 2 via the bearings 61, 72, and the flange portion 34a includes the widened portion 34b for supporting the bearings 61, 72 from the radially outer side, the widened portion 34b expanding in the axial direction from the end portion on the side of the rotating shaft. In addition, the first resolver stator 63b and the second resolver stator 73b are located on the radially outer side with respect to the widened portion 34b. Such a configuration allows the bearings 61, 72 and the first and second resolvers 63, 73 to be located closer to each other, without incurring interference between the flange portion 34a and the first and second resolver stators 63b, 73b, thereby further reducing the axial length of the driving unit 100.

Here, the foregoing advantageous effect of the present disclosure can be obtained by locating at least one of the first resolver stator 63b and the second resolver stator 73b on the radially outer side of the widened portion 34b.

Still further, the first resolver stator 63b and the second resolver stator 73b are fixed with the bolt screwed in the hole 34c formed in the flange portion 34a for common use. Such a configuration allows the first and the second resolver stators 63b, 73b to be fastened with the same hole, which facilitates and simplifies the assembly work.

Still further, the stators 65, 75 of the generator 60 and the motor 70 have the segmented winding structure, and the windings respectively forming the pairs of crossover sections 68a, 68b, 78a, 78b located at the respective end portions of the stators 65, 75 of the generator 60 and the motor 70 in the axial direction are axially shifted such that the crossover sections 68a, 68b, 78a, 78b in each pair differ in axial height. The stators 65, 75 of the generator 60 and the motor 70 are disposed such that the end face of the generator 60 where the crossover section 68a having the higher axial height is located and the end face of the motor 70 where the crossover section 78a having the higher axial height is located are opposed to each other, and, in the stators 65, 75 of the generator 60 and the motor 70, the crossover sections 68a, 78a having the higher axial height have generally the same height as the width of the first resolver 63 and the second resolver 73 in the axial direction. Therefore, the space between the generator 60 and the motor 70 is optimized as the space for accommodating therein the resolvers 63, 73, and the crossover sections 68b, 78b located on the axially outer side have a reduced height. Such a configuration further reduces the axial length of the driving unit.

The driving unit according to the present disclosure is in no way limited to the foregoing embodiment, but may be modified or improved as desired within the scope of the present disclosure.

For example, the casing in the present disclosure is not limited to being composed of the first to the third casings 33, 34, 35 as in the foregoing embodiment. It suffices that the casing is configured so as to properly accommodate therein the first and second electrical rotating machines and the first and second resolvers.

In a first aspect, the present disclosure provides a driving unit (for example, a driving unit for hybrid vehicle 100 in an embodiment described above) including a first electrical rotating machine (for example, a generator 60 in the embodiment), a second electrical rotating machine (for example, a motor 70 in the embodiment), a first resolver (for example, a first resolver 63 in the embodiment) that detects a rotation angle of the first electrical rotating machine, and a second resolver (for example, a second resolver 73 in the embodiment) that detects a rotation angle of the second electrical rotating machine, the first and second electrical rotating machines and the first and second resolvers being coaxially disposed and accommodated inside a casing (for example, a driving unit casing 32 in the embodiment).

The first resolver and the second resolver are located between the first electrical rotating machine and the second electrical rotating machine.

In a second aspect, preferably the present disclosure provides the driving unit, in which the first resolver includes a first resolver rotor (for example, a first resolver rotor 63a in the embodiment) and a first resolver stator (for example, a first resolver stator 63b in the embodiment), the second resolver includes a second resolver rotor (for example, a second resolver rotor 73a in the embodiment) and a second resolver stator (for example, a second resolver stator 73b in the embodiment), the first resolver stator and the second resolver stator are oriented opposite to each other in the axial direction such that respective signal line draw-out portions (for example, signal line draw-out portions 66, 76 in the embodiment) are located close to the center therebetween, and a first signal line (for example, a first signal line 67 in the embodiment) from the first resolver stator and a second signal line (for example, a second signal line 77 in the embodiment) from the second resolver stator are bundled together and connected to a control unit.

In a third aspect, preferably the present disclosure provides the driving unit in which the first resolver includes the first resolver rotor and the first resolver stator, the second resolver includes the second resolver rotor and the second resolver stator, the casing includes a flange portion (for example, a flange portion 34a in the embodiment) that supports rotating shafts (for example, outer circumferential shafts 2b, 2c in the embodiment) via bearings (for example, bearings 61, 72 in the embodiment), the flange portion being located between the first resolver and the second resolver, the flange portion includes a widened portion (for example, a widened portion 34b in the embodiment) formed at an end portion on the side of the rotating shaft so as to expand in the axial direction for supporting the bearing from a radially outer side, and at least one of the first resolver stator and the second resolver stator is located on a radially outer side of the widened portion.

In a fourth aspect, preferably the present disclosure provides the driving unit in which the first resolver includes the first resolver rotor and the first resolver stator, the second resolver includes the second resolver rotor and the second resolver stator, the casing includes a flange portion that supports rotating shafts, the flange portion being located between the first resolver and the second resolver, and the first resolver stator and the second resolver stator are fastened with a bolt screwed in a hole (for example, a hole 34c in the embodiment) formed in the flange portion for common use.

In a fifth aspect, preferably the present disclosure provides the driving unit in which the respective stators (for example, stators 65, 75 in the embodiment) of the first electrical rotating machine and the second electrical rotating machine have a segmented winding structure, the windings respectively forming pairs of crossover sections (for example, pairs of crossover sections 68a, 68b, 78a, 78b in the embodiment) located at respective end portions in the axial direction of the stators of the first electrical rotating machine and the second electrical rotating machine are axially shifted such that the crossover sections in each pair differ in axial height, the respective stators of the first electrical rotating machine and the second electrical rotating machine are disposed such that an end face of the first electrical rotating machine where the crossover section (for example, a crossover section 68a in the embodiment) having the higher axial height is located and an end face of the second electrical rotating machine where the crossover section (for example, a crossover section 78a in the embodiment) having the higher axial height is located are opposed to each other, and the crossover sections having the higher axial height in the respective stators of the first electrical rotating machine and the second electrical rotating machine have generally the same height as a width of the first resolver and the second resolver in the axial direction.

With the driving unit according to the first aspect, the first and second resolvers are located in the dead space defined between the first and second electrical rotating machines. Such a configuration suppresses an increase in overall axial length of the driving unit can be suppressed.

The driving unit according to the second aspect simplifies the routing work of the first signal line and the second signal line.

With the driving unit according to the third aspect, the bearings and the first and second resolvers can be located closer to each other without incurring interference between the flange portions and the first and the second resolver stators, and therefore the axial length of the driving unit can be further reduced.

With the driving unit according to the fourth aspect, the first and the second resolver stators can be fastened with the same hole, which facilitates and simplifies the assembly work.

With the driving unit according to the fifth aspect, the space between the first and second electrical rotating machines is optimized as the space for accommodating therein the resolvers, and the crossover sections located on the axially outer side have a reduced height. Such a configuration further reduces the axial length of the driving unit.

Obviously, numerous modifications and variations of the present invention are possible in light of the above teachings. It is therefore to be understood that within the scope of the appended claims, the invention may be practiced otherwise than as specifically described herein.

What is claimed is:

1. A driving apparatus comprising:
a first electrical rotating machine having a first stator;
a second electrical rotating machine having a second stator;
windings respectively forming pairs of crossover sections located at respective end portions in the axial direction of each of the stators of the first electrical rotating machine and the second electrical rotating machine, the windings being axially shifted such that the crossover sections in each pair differ in axial height;
a first resolver that detects a rotation angle of the first electrical rotating machine; and
a second resolver that detects a rotation angle of the second electrical rotating machine, the first and second electrical rotating machines and the first and second resolvers being coaxially disposed and accommodated inside a casing,
wherein the first resolver and the second resolver are located between the first electrical rotating machine and the second electrical rotating machine,
wherein the respective stators of the first electrical rotating machine and the second electrical rotating machine are disposed such that an end face of the first electrical rotating machine where the crossover section having the higher axial height is located and an end face of the second electrical rotating machine where the crossover section having the higher axial height is located are opposed to each other, and
wherein the first resolver and the second resolver are disposed in a space defined between the end face of the first electrical rotating machine where the crossover section having a higher axial height is located and the end face of the second electrical rotating machine where the crossover section having a higher axial height is located.

2. The driving apparatus according to claim 1,
wherein the first resolver includes a first resolver rotor and a first resolver stator,
the second resolver includes a second resolver rotor and a second resolver stator,
the first resolver stator and the second resolver stator are oriented opposite to each other in the axial direction such that respective signal line draw-out portions are located close to the center therebetween, and
a first signal line from the first resolver stator and a second signal line from the second resolver stator are bundled together and connected to a control unit.

3. The driving apparatus according to claim 1,
wherein the first resolver includes a first resolver rotor and a first resolver stator,
the second resolver includes a second resolver rotor and a second resolver stator,
the casing includes a flange portion that supports a rotating shaft via a bearing, the flange portion being located between the first resolver and the second resolver,
the flange portion includes a widened portion formed at an end portion on the side of the rotating shaft so as to expand in the axial direction for supporting the bearing from a radially outer side, and
at least one of the first resolver stator and the second resolver stator is located on a radially outer side of the widened portion.

4. The driving apparatus according to claim 1,
wherein the first resolver includes a first resolver rotor and a first resolver stator,
the second resolver includes a second resolver rotor and a second resolver stator,
the casing includes a flange portion that supports a rotating shaft, the flange portion being located between the first resolver and the second resolver, and
the first resolver stator and the second resolver stator are fastened with a bolt screwed in a hole formed in the flange portion for common use.

5. The driving apparatus according to claim 1,
wherein the respective stators of the first electrical rotating machine and the second electrical rotating machine have a segmented winding structure, and
the crossover sections having the higher axial height in the respective stators of the first electrical rotating machine and the second electrical rotating machine have generally the same height as a width of the first resolver and the second resolver in the axial direction.

6. The driving apparatus according to claim 1, further comprising a rotating shaft defining an axial direction and a radial direction,
wherein the first resolver includes a first resolver stator,
wherein the second resolver includes a second resolver stator,
wherein the first and second rotating machines and the first and second resolvers are coaxially disposed about the rotating shaft,
wherein the casing includes a flange portion located between the first resolver and the second resolver, the flange portion including a widened portion which is widened in the axial direction for supporting the rotating shaft via a bearing, and
at least one of the first resolver stator and the second resolver stator is disposed outward in the radial direction relative to the widened portion, and
wherein the widened portion is disposed directly between the first resolver and the second resolver.

7. The driving apparatus according to claim 1,
a rotating shaft defining an axial direction and a radial direction,
wherein the first resolver includes a first resolver stator,
wherein the second resolver includes a second resolver stator,
wherein the first and second rotating machines and the first and second resolvers are coaxially disposed about the rotating shaft,
wherein the casing includes a flange portion located between the first resolver and the second resolver, the flange portion including a widened portion which is widened in the axial direction for supporting the rotating shaft via a bearing, and at least one of the first resolver stator and the second resolver stator is disposed outward in the radial direction relative to the widened portion, and wherein the bearing is disposed on an inner side of the widened portion in the radial direction.

8. A driving apparatus comprising:

a first electrical rotating machine having a first stator;

a second electrical rotating machine having a second stator;

windings respectively forming pairs of crossover sections located at respective end portions in an axial direction of the stators of the first electrical rotating machine and the second electrical rotating machine are axially shifted such that the crossover sections in each pair differ in axial height, a first resolver configured to detect a rotation angle of the first electrical rotating machine; and a second resolver configured to detect a rotation angle of the second electrical rotating machine, the first and second electrical rotating machines and the first and second resolvers being coaxially disposed inside a casing, the first resolver and the second resolver being provided between the first electrical rotating machine and the second electrical rotating machine, wherein the respective stators of the first electrical rotating machine and the second electrical rotating machine are disposed such that an end face of the first electrical rotating machine where the crossover section having a higher axial height is provided and an end face of the second electrical rotating machine where the crossover section having the higher axial height is provided are opposed to each other, and wherein the first resolver and the second resolver are disposed in a space defined between the end face of the first electrical rotating machine where the crossover section having a higher axial height is located and the end face of the second electrical machine where the crossover having the higher axial height is located.

9. The driving apparatus according to claim 8, wherein the first resolver includes a first resolver rotor and a first resolver stator, the second resolver includes a second resolver rotor and a second resolver stator, the first resolver stator and the second resolver stator are oriented opposite to each other in an axial direction such that respective signal line draw-out portions are provided close to a center therebetween, and a first signal line from the first resolver stator and a second signal line from the second resolver stator are bundled together and connected to a controller.

10. The driving apparatus according to claim 9, wherein the casing includes a flange portion that supports a rotating shaft via a bearing, the flange portion being provided between the first resolver and the second resolver, the flange portion includes a routing hole, and the first signal line and the second signal line are bundled together, drawn out from the casing through the routing hole, and connected to the controller.

11. The driving apparatus according to claim 9, wherein the casing includes a flange portion that supports a rotating shaft via a bearing, the flange portion being provided between the first resolver and the second resolver, the first resolver stator and the second resolver stator are fastened with a bolt screwed in a hole provided in the flange portion for common use, and the signal line draw-out portions are provided on a radially outer side with respect to the hole.

12. The driving apparatus according to claim 8, wherein the first resolver includes a first resolver rotor and a first resolver stator, the second resolver includes a second resolver rotor and a second resolver stator, the casing includes a flange portion that supports a rotating shaft via a bearing, the flange portion being provided between the first resolver and the second resolver, the flange portion includes a widened portion provided at an end portion on a side of the rotating shaft so as to expand in an axial direction for supporting the bearing from a radially outer side, and at least one of the first resolver stator and the second resolver stator is provided on a radially outer side of the widened portion.

13. The driving apparatus according to claim 8, wherein the first resolver includes a first resolver rotor and a first resolver stator, the second resolver includes a second resolver rotor and a second resolver stator, the casing includes a flange portion that supports a rotating shaft, the flange portion being provided between the first resolver and the second resolver, and the first resolver stator and the second resolver stator are fastened with a bolt screwed in a hole provided in the flange portion for common use.

14. The driving apparatus according to claim 8, wherein the respective stators of the first electrical rotating machine and the second electrical rotating machine have a segmented winding structure, and the crossover sections having the higher axial height in the respective stators of the first electrical rotating machine and the second electrical rotating machine have generally a same height as a width of the first resolver and the second resolver in the axial direction.

15. The driving apparatus according to claim 8, further comprising a rotating shaft defining an axial direction and a radial direction, wherein the first resolver includes a first resolver stator, wherein the second resolver includes a second resolver stator, wherein the first and second rotating machines and the first and second resolvers are coaxially disposed about the rotating shaft, wherein the casing includes a flange portion located between the first resolver and the second resolver, the flange portion including a widened portion which is widened in the axial direction for supporting the rotating shaft via a bearing, and at least one of the first resolver stator and the second resolver stator is disposed outward in the radial direction relative to the widened portion, and wherein the widened portion is disposed directly between the first resolver and the second resolver.

16. The driving apparatus according to claim 8, a rotating shaft defining an axial direction and a radial direction, wherein the first resolver includes a first resolver stator, wherein the second resolver includes a second resolver stator, wherein the first and second rotating machines and the first and second resolvers are coaxially disposed about the rotating shaft, wherein the casing includes a flange portion located between the first resolver and the second resolver, the flange portion including a widened portion which is widened in the axial direction for supporting the rotating shaft via a bearing, and at least one of the first resolver stator and the second resolver stator is disposed outward in the radial direction relative to the widened portion, and wherein the bearing is disposed on an inner side of the widened portion in the radial direction.

\* \* \* \* \*